O. V. HUMANN.
PERSPECTIVE FINDER.
APPLICATION FILED AUG. 13, 1914.
1,138,480.
Patented May 4, 1915.
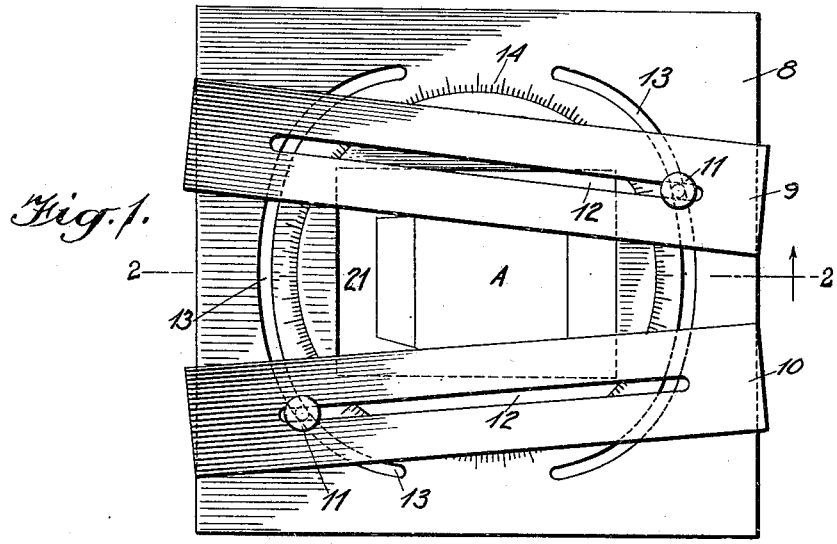
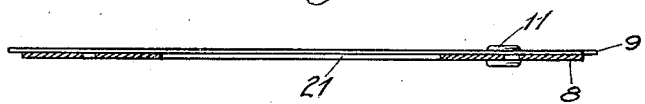
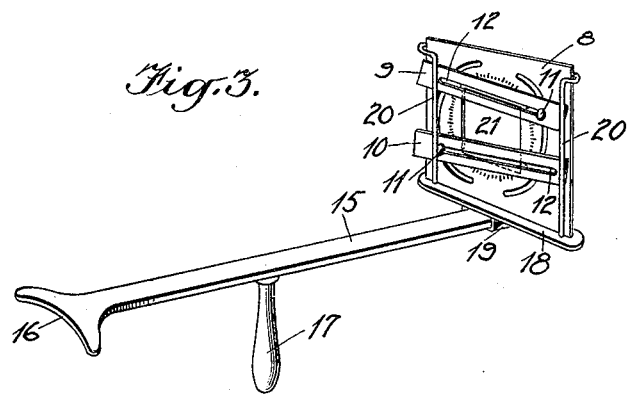
WITNESSES
INVENTOR
Otto V. Humann
BY
ATTORNEYS

UNITED STATES PATENT OFFICE.

OTTO V. HUMANN, OF WORCESTER, MASSACHUSETTS.

PERSPECTIVE-FINDER.

1,138,480.   Specification of Letters Patent.   Patented May 4, 1915.

Application filed August 13, 1914. Serial No. 856,628.

*To all whom it may concern:*

Be it known that I, OTTO V. HUMANN, a citizen of the United States, and a resident of Worcester, in the county of Worcester and State of Massachusetts, have invented a new and Improved Perspective-Finder, of which the following is a full, clear, and exact description.

Among the principal objects which the present invention has in view are: to provide means for ascertaining the correct perspective angle of distant objects; to provide means for demonstrating the convergence of boundary lines of said objects and show the vanishing point for perspective drawings; to provide an instrument for aiding in teaching elementary perspective and free hand drawing, and more particularly in the teaching of the rules relating to, and for familiarizing the scholar with the method followed in applying the same to perspective drawings; to provide means for disposing in definite arrangement, the field of vision to which a drawing is to be limited; and to provide an instrument of the character mentioned which is inexpensive, compact and readily adjusted to its various uses.

Figure 1 is a side view of an instrument constructed and arranged in accordance with the present invention, shown as in operation; Fig. 2 is a section of the instrument taken on the line 2—2 in Fig. 1; Fig. 3 is a perspective view of an instrument constructed and arranged in accordance with the present invention, and a holder therefor.

As seen in the accompanying drawings, the finder is primarily constructed of a plate 8 and two straight edged blades 9 and 10. The blades 9 and 10 are operatively connected with the plate 8 by means of pivoted rivets 11. The rivets extend through the straight slots 12 of the blades 9 and 10 and the curved slots 13 formed in the plate 8. The curved slots 13 encompass the rectangular opening 21 centrally disposed in plate 8. The slots 13 are preferably matched or formed from the same centers oppositely disposed; this, however, may be varied, as it is not necessary that the slots 13 be duplicates.

While the instrument is used principally as a finder for the angles or vanishing lines in perspective, it will be understood that it may be used in other ways, such as for ascertaining the position and direction of distant objects. For the latter it has been found convenient to provide a graduated scale or circle 14 having degree markings thereon. It is obvious that when one or both of the blades 9 and 10 are adjusted on the plate 8 and held in a vertical position in front of the eye, the angle of this position could be determined by reading on the scaled circle 14 the angular relation to the perpendicular and horizontal of the line to which the blade has been adjusted.

When employing a finder constructed and arranged as described, and as shown in the accompanying drawings, it has been found desirable to employ some means for preserving the original distance between the eye of the observer and the plate 8, for repeated uses of the finder. Many expedients may be employed, such as elongating and extending the body of the plate 8 at an angle perpendicular thereto, which extensions, when rested against the face of the observer, would secure the desired object.

In Fig. 3 of the drawings I have shown a holder having an elongated slide-bar 15, having a face rest or crotch 16, against which the chin or other convenient portion of the face may be pressed, when using the instrument. A handle 17 may be provided to hold the bar 15. A supporting frame having a base-bar 18 is slidably mounted on the bar 15 by the loop 19. Erected on the bar 18 are wire guides 20 spaced apart to form holders for the plate 8 and the blades 9 and 10 when mounted thereon. Any suitable means may be employed for holding the loop 19 and the frame connected therewith rigidly immovable after the frame has been adjusted on the bar 15 to the object or scene which it is desired to copy or map out.

While I have herein described the construction and employment of the bar 15 and parts connected therewith, for holding and adjusting the plate 8, it will be understood that the use of this holder is not essential, as the plate 8 may be supported in the hands of the user, with desirable results.

When employing the instrument here described, it is held in the hands of the operator, and the opening 21 adjusted to the view or object which it is desired to observe. The blades 9 and 10 are then shifted by the manipulator until, as shown in Fig. 1 of the drawings, the blades 9 and 10 are disposed to coincide with the receding edges of one of the planes or faces of the object to be drawn. From the inclination or disposition of the blades 9 and 10 on the finder 8, the observer will have a fixed idea of the general convergence of the lines toward their vanishing point. He will also observe the slope of the line in relation to the right angles of the opening 21 on the plate 8. See Fig. 1—cube A. The disposition of any set of lines may be observed or traced to their vanishing points in this way, by the manipulation of blades 9 and 10. Should it be desirable to ascertain the angular relation of the object as seen by the manipulator, the blades 9 and 10 are moved about until in a crossed position so that the blades 9 and 10 point to right and left and cover both receding edges of the object, thus forming the angle under observation. The student may compare this angle as located on the finder 8, as per blades 9 and 10, with a drawing he may have made free hand or else trace it directly upon his paper by laying the finder 8 upon the paper and lightly tracing the angle as located by blades 9 and 10, and extending the receding lines as desirable for the size of his drawing.

It will be understood that the plate 8 and blades 9 and 10 may be constructed from any suitable material, such as cardboard, celluloid, aluminum or brass. Also, it will be understood that the rivets 11 may be homogeneous and permanent in form, or arranged to be separated from the plate 8 or blades 9 and 10, so that the parts of the instrument may be dissociated. Further, it will be understood that while a particular form of holder has been described, a variety of devices either integrally connected or temporarily connected with the plate 8, may be employed to obtain substantially similar results.

Claims:

1. An instrument as characterized, comprising a plate constructed from opaque material and having a rectangular view opening centrally disposed and a plurality of slots surrounding said opening, at opposite sides thereof; a plurality of straight-edged blades adapted to extend across said opening, for locating position and direction of distant objects in relation to said opening; and devices extending through said slots to connect the blades adjustably to said plate.

2. An instrument as characterized, comprising a plate constructed from opaque material and having a rectangular view opening centrally disposed, and having a plurality of slots surrounding said opening, at opposite sides thereof; a plurality of straight-edged blades adapted to extend across said opening, for locating position and direction of distant objects in relation to said opening; and a plurality of rivets pivotally and slidably connecting said blades and said plate, said rivets extending through said slots.

3. An instrument as characterized, comprising a plate constructed from opaque material, having a rectangular view opening centrally disposed and provided with a plurality of slots, said slots being disposed at opposite sides of said opening; a plurality of straight-edged blades, each having a longitudinally-disposed slot; and a plurality of connecting pivots extending through said slots in said blades and said plate, for movably and slidably mounting said blades on said plate.

4. An instrument as characterized, comprising a plate constructed from opaque material, having a rectangular view opening centrally disposed and provided with a plurality of slots, said slots being disposed at opposite sides of said opening; a plurality of straight-edged blades, each having a longitudinally-disposed slot; a plurality of connecting pivots extending through said slots in said blades and said plate, for movably and slidably mounting said blades on said plate, said plate being provided with a scale, surrounding said opening, for determining the angles of distance of said blades in relation to said opening.

In testimony whereof I have signed my name to this specification in the presence of two subscribing witnesses.

OTTO V. HUMANN.

Witnesses:
E. F. MURDOCK,
PHILIP D. ROLLHAUS.

Copies of this patent may be obtained for five cents each, by addressing the "Commissioner of Patents Washington, D. C."